US012520822B2

(12) United States Patent
van Eyk et al.

(10) Patent No.: US 12,520,822 B2
(45) Date of Patent: Jan. 13, 2026

(54) COMBINATION PET GROOMING TOOL AND METHODS

(71) Applicant: Spectrum Brands, Inc., Middleton, WI (US)

(72) Inventors: Gregory van Eyk, Middleton, WI (US); Terry Allen Willemin, Middleton, WI (US); Elizabeth Lee Mondloch, Middleton, WI (US); William Nathan Brunner, Middleton, WI (US); William D. Himes, Middleton, WI (US)

(73) Assignee: Spectrum Brands, Inc., Middleton, WI (US)

( * ) Notice: Subject to any disclaimer, the term of this patent is extended or adjusted under 35 U.S.C. 154(b) by 0 days.

(21) Appl. No.: 18/582,979

(22) Filed: Feb. 21, 2024

(65) Prior Publication Data

US 2024/0276952 A1     Aug. 22, 2024

Related U.S. Application Data

(60) Provisional application No. 63/539,687, filed on Sep. 21, 2023, provisional application No. 63/447,424, filed on Feb. 22, 2023.

(51) Int. Cl.
    *A01K 13/00*      (2006.01)
(52) U.S. Cl.
    CPC .................................. *A01K 13/002* (2013.01)
(58) Field of Classification Search
    CPC ................................................... A01K 13/002
    USPC ............................... 15/415.1, 422, 402, 119
    See application file for complete search history.

(56) References Cited

U.S. PATENT DOCUMENTS

| | | | |
|---|---|---|---|
| 441,136 A | 11/1890 | Clements | |
| 588,352 A | 8/1897 | Powell | |
| 819,790 A | 5/1906 | Neste | |
| 926,766 A | 7/1909 | Rauh | |
| 962,666 A * | 6/1910 | Rahn | A01K 13/002 119/629 |
| 992,250 A | 5/1911 | Rauh | |
| 1,095,515 A * | 5/1914 | Noble | A01K 13/002 119/628 |
| 1,155,247 A | 9/1915 | Kellett | |
| 1,164,204 A * | 12/1915 | Mullett et al. | A01K 13/002 119/628 |

(Continued)

FOREIGN PATENT DOCUMENTS

| | | |
|---|---|---|
| CN | 107410071 A | 12/2017 |
| CN | 217694844 U | 11/2022 |

(Continued)

OTHER PUBLICATIONS

International Search Report and Written Opinion for PCT/US2024/016727 (Jun. 13, 2024).

*Primary Examiner* — Morgan T Jordan
(74) *Attorney, Agent, or Firm* — Merchant & Gould P.C.

(57) ABSTRACT

A pet grooming tool has a pet engageable portion and a handle portion. The pet engageable portion has a first section of a first brush characteristic and a second section of second brush characteristics different from the first brush characteristic. The handle portion is secured to the pet engageable portion sized for grasping by a human hand. A fur removal mechanism removes fur from the pet engageable portion.

31 Claims, 16 Drawing Sheets

(56) References Cited

U.S. PATENT DOCUMENTS

| | | | |
|---|---|---|---|
| 1,235,138 A * | 7/1917 | Harris | A01K 13/002 119/628 |
| 1,339,863 A | 5/1920 | Rechter | |
| 2,486,203 A | 10/1949 | Pieper | |
| 3,059,260 A | 10/1962 | Peilet | |
| 3,368,554 A | 2/1968 | Hwa | |
| 4,001,910 A | 1/1977 | Peilet | |
| 4,162,554 A | 7/1979 | Peilet | |
| 4,412,365 A | 11/1983 | Schmitt | |
| 4,567,905 A | 2/1986 | Stewart et al. | |
| 4,596,261 A | 6/1986 | Renda et al. | |
| 5,267,528 A | 12/1993 | Murieen, Sr. | |
| 5,815,877 A | 10/1998 | Heneveld | |
| 5,862,563 A | 1/1999 | Hartmann | |
| 6,070,594 A | 6/2000 | Mears | |
| 6,421,872 B1 | 7/2002 | Sciandivasci | |
| 6,427,633 B1 | 8/2002 | Ogden | |
| 6,513,457 B2 * | 2/2003 | Huddleston | A01K 13/002 119/664 |
| 6,595,219 B2 | 7/2003 | Anderson | |
| 6,631,831 B1 | 10/2003 | Loiselle | |
| 6,782,846 B1 | 8/2004 | Porter et al. | |
| 6,968,848 B2 | 11/2005 | Grant et al. | |
| 7,077,076 B2 | 7/2006 | Porter et al. | |
| 7,222,588 B2 | 5/2007 | Porter et al. | |
| 7,334,540 B2 | 2/2008 | Porter et al. | |
| 7,509,926 B2 | 3/2009 | Porter et al. | |
| 7,650,857 B2 | 1/2010 | Porter et al. | |
| D626,295 S | 10/2010 | Porter | |
| D626,296 S | 10/2010 | Porter | |
| D626,297 S | 10/2010 | Porter | |
| 7,854,214 B2 | 12/2010 | Khubani et al. | |
| D672,923 S | 12/2012 | Loudenback et al. | |
| D672,924 S | 12/2012 | Amice et al. | |
| 8,960,129 B2 | 2/2015 | Porter et al. | |
| 9,060,496 B2 | 6/2015 | Porter et al. | |
| D787,138 S | 5/2017 | Porter | |
| D787,755 S | 5/2017 | Porter | |
| D790,139 S | 6/2017 | Loudenback et al. | |
| D790,140 S | 6/2017 | Amice et al. | |
| D790,781 S | 6/2017 | Cafasso et al. | |
| 10,028,485 B2 | 7/2018 | Cafasso et al. | |
| 10,589,415 B2 | 3/2020 | Cafasso | |
| D905,354 S | 12/2020 | Favia et al. | |
| D905,916 S | 12/2020 | Favia et al. | |
| D932,714 S | 10/2021 | Favia et al. | |
| D932,715 S | 10/2021 | Favia et al. | |
| 11,147,239 B2 | 10/2021 | Porter et al. | |
| 11,464,207 B2 * | 10/2022 | Di | A46B 5/02 |
| 11,606,930 B2 | 3/2023 | Porter et al. | |
| 2002/0029749 A1 * | 3/2002 | Berman | A01K 13/002 119/628 |
| 2003/0172947 A1 | 9/2003 | Wang | |
| 2005/0055788 A1 | 3/2005 | Chang et al. | |
| 2006/0207623 A1 | 9/2006 | Kung | |
| 2007/0033758 A1 | 2/2007 | Wang | |
| 2007/0169293 A1 * | 7/2007 | Wang | A46B 17/06 15/159.1 |
| 2008/0078333 A1 | 4/2008 | Wang | |
| 2009/0126649 A1 * | 5/2009 | Porter | A01K 13/002 15/246.2 |
| 2010/0122663 A1 | 5/2010 | Fernandez | |
| 2010/0294208 A1 * | 11/2010 | Dyson | A46B 7/023 15/415.1 |
| 2010/0294210 A1 * | 11/2010 | Dyson | A47L 9/0072 15/415.1 |
| 2011/0297101 A1 * | 12/2011 | Fernandez | A01K 13/002 119/603 |
| 2012/0060311 A1 * | 3/2012 | Wang | A46B 17/06 15/168 |
| 2015/0047575 A1 * | 2/2015 | Jui-Tsang | A01K 13/002 119/628 |
| 2015/0059656 A1 * | 3/2015 | Jui-Tsang | A46B 17/06 15/160 |
| 2015/0272308 A1 | 10/2015 | Harrington et al. | |
| 2017/0172105 A1 | 6/2017 | Murrihy et al. | |
| 2017/0295753 A1 * | 10/2017 | Cathaud | A46B 7/023 |
| 2018/0132452 A1 | 5/2018 | Dionne et al. | |
| 2020/0060231 A1 * | 2/2020 | Lin | A01K 13/002 |
| 2022/0279756 A1 * | 9/2022 | Zhang | A01K 13/002 |
| 2022/0386565 A1 * | 12/2022 | Pan | A01K 13/002 |
| 2024/0032679 A1 * | 2/2024 | Wu | A46B 7/023 |
| 2024/0349697 A1 * | 10/2024 | Sumners | A46B 17/06 |

FOREIGN PATENT DOCUMENTS

| | | | |
|---|---|---|---|
| DE | 202007016178 U1 * | 4/2008 | A01K 13/002 |
| JP | 61035607 A | 3/1986 | |
| JP | 31022720 A | 12/1991 | |
| JP | 04190725 A | 7/1992 | |
| JP | 60038666 A | 5/1994 | |
| JP | 30014899 A | 8/1995 | |
| JP | 10028615 A | 2/1998 | |
| JP | 2001000068 A | 1/2001 | |
| JP | 30092121 B | 2/2003 | |
| JP | 31025661 B | 9/2006 | |
| WO | 2020105783 A1 | 5/2020 | |
| WO | 2023023068 A1 | 2/2023 | |

* cited by examiner

COMBINATION PET GROOMING TOOL AND METHODS

This application claims priority to U.S. provisional patent application 63/539,687 filed on Sep. 21, 2023; and to U.S. provisional patent application 63/447,424 filed on Feb. 22, 2023, the disclosures of which are herein incorporated by reference in their entirety.

TECHNICAL FIELD

This disclosure relates grooming tools for animals, especially fur-coated animals. In particular, this disclosure relates to grooming tools for furry pets, in which the grooming tool has more than one brush characteristic.

BACKGROUND

Many households include animals as pets. For animals with fur coats, it is helpful to groom the animal to help keep the fur coat healthy and to prevent shedding of the fur throughout the owner's house.

There are a variety of types of grooming tools available including, for example, deshedding tools that help to remove loose, dead undercoat without cutting or damaging the topcoat. One type of deshedding tool is described in U.S. Pat. No. 7,650,857, incorporated herein by reference. Additional types of grooming tools include mat breakers, curry combs, bristle brushes, wire pin brushes, and slicker brushes.

It can be burdensome to have multiple grooming tools. Improvements are desirable.

SUMMARY

A pet grooming tool is provided that improves the prior art.

In general, a pet grooming tool is provided comprising: a pet engageable portion having a first brush section of a first brush characteristic and a second brush section of a second brush characteristic different from the first brush characteristic; a handle portion secured to the pet engageable portion sized for grasping by a human hand; and a fur removal mechanism to remove fur from the pet engageable portion.

In example embodiments, the fur removal mechanism comprises a push button to eject fur from the first brush section and second brush section.

In example embodiments, the first brush section and second brush section are adjacent each other.

In one or more embodiments, the first brush characteristic is a deshedder constructed and arranged to remove loose, dead undercoat without cutting or damaging a topcoat.

In example embodiments, the deshedder comprises a plurality of teeth having a plane of symmetry and a tip; the plane of symmetry defining a cross-section of the tip of the tooth; the cross-section of the tip of the tooth having a corner with an interior angle of between fifty and seventy degrees.

In some examples, the brush characteristic of the second brush section is a slicker constructed and arranged to remove debris, tangles, and mat from fur.

In example embodiments, the slicker comprises a plurality of flexible fine wire bristles.

In some examples, the flexible fine wire bristles are angled in a direction toward the first brush section, as the flexible fine wire bristles extend from the pet engageable portion and out to terminal ends thereof.

In one or more embodiments, the pet engageable portion comprises a base; the base having a handle-engageable surface connected to the handle portion, and an opposite brush surface including the first brush section and second brush section; the fur removal mechanism includes a moveable ejector plate and a push button connected to the ejector plate; the push button being positioned on the handle-engageable surface of the base; the ejector plate being moveably mounted to slide over the second brush section; the ejector plate having an edge mounted to slidably engage the first brush section; and wherein when the push button is pressed toward the base, the ejector plate slides over the second brush section and against the first brush section to move fur from the first brush section and second brush section.

In example embodiments, the push button is positioned in a button housing on the base; the button housing including a spring to bias the push button.

In some examples, the second brush section includes plurality of bristles, arranged in a plurality of columns and rows; and the ejector plate includes a plurality of open slots positioned to contain and slide over the bristles.

In one or more embodiments, the first brush section includes row of teeth; and the ejector plate edge slides against and along the teeth.

In example embodiments, the first brush characteristic is a deshedder section, and the second brush characteristic is a slicker.

In some examples, the ejector plate includes a projecting lip that engages against an edge of the base.

In some embodiments, the handle portion includes: a fixed piece secured to and projecting away from the pet engageable portion; a free distal end; and an elongated grip extending between the fixed piece and the distal end; the grip being axially and radially spaced from the pet engageable portion.

In example embodiments, the handle portion includes: a fixed piece secured to and projecting away from the pet engageable portion; a free distal end; an elongated grip extending from the fixed piece and defining the distal end; the grip being axially and radially spaced from the pet engageable portion; and wherein the push button is positioned to project from the pet engageable portion adjacent to the fixed piece.

In one or more examples, the fur removal mechanism includes a moveable ejector plate and a push button connected to the ejector plate.

In some implementations, the ejector plate is moveably mounted to slide over the second brush section.

In example embodiments, the ejector plate has an edge mounted to slidably engage the first brush section.

Some examples include the first brush section being nearer the handle portion than the second brush section.

In further embodiments, there is a scraper mounted to slidably engage near or against the first brush section.

In example implementations, the scraper includes an attachment member secured to the ejector plate and a blade projecting from the attachment member.

The blade may be angled from the attachment member at a non-zero and non-perpendicular angle in a direction toward the first brush section.

In another aspect, a method of grooming a pet is provided. The method comprises grasping a handle of a grooming tool; the handle secured to a pet engageable portion; moving the pet engageable portion against fur of a pet, the pet engageable portion having a first brush section of a first brush characteristic adjacent to a second brush section having a second brush characteristic different from the first brush characteristic; and ejecting fur from the first brush section and second brush section.

Some example methods include the step of ejecting fur is by pushing a button.

In some implementations, the step of moving the pet engageable portion includes moving the first brush section being a deshedder section, and the second brush section being a slicker section.

In some examples, the step of using a moveable ejector plate includes moving a scraper to slidably engage near or against the first brush section.

In some examples, the step of moving a scraper includes moving a blade angled toward the first brush section.

It is noted that not all the specific features described herein need to be incorporated in a arrangement for the arrangement to have some selected advantage according to the present disclosure.

Figure 1:
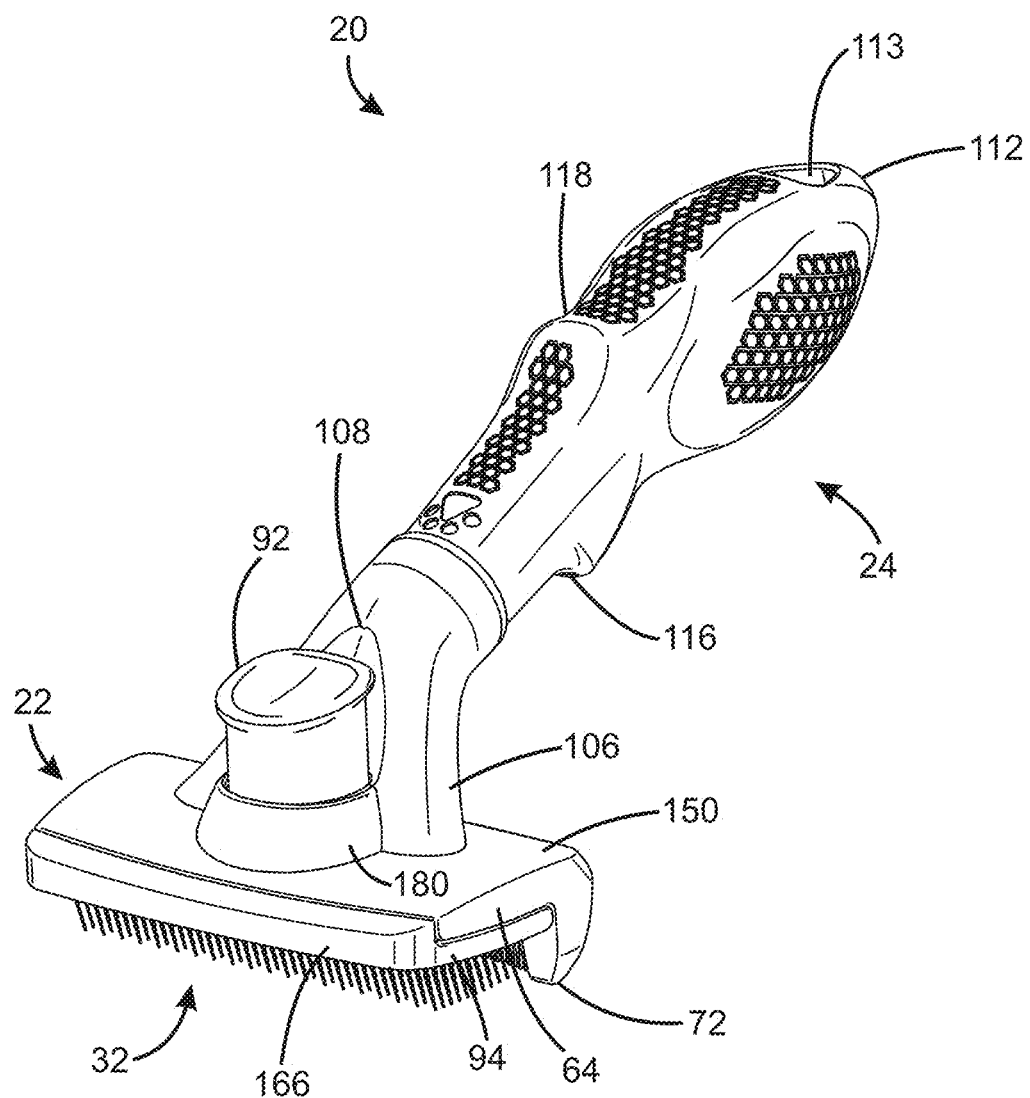
FIG. 1 is a top perspective view of an embodiment of a grooming tool, constructed in accordance with principles of this disclosure.

The present technology may be more completely understood and appreciated in consideration of the following detailed description of various embodiments in connection with the accompanying drawings.

The figures are rendered primarily for clarity and, as a result, are not necessarily drawn to scale. Moreover, various structure/components, including but not limited to fasteners, and the like, may be shown diagrammatically or removed from some or all of the views to better illustrate aspects of the depicted embodiments, or where inclusion of such structure/components is not necessary to an understanding of the various exemplary embodiments described herein. The lack of illustration or description of such structure/components in a particular figure is, however, not to be interpreted as limiting the scope of the various embodiments in any way.

DETAILED DESCRIPTION

A pet grooming tool is shown in general at 20. The tool 20 includes a pet engageable portion 22 and a handle portion 24. The handle portion 24 is secured to the pet engageable portion 22, and is sized for grasping by a human hand.

The pet engageable portion 22 is moved on, over, or against an animal's coat for grooming purposes. In general, the animal's coat will be of fur or hair. For example, the animal can be such animals that are typically kept as pets, including dogs or cats, but the tool 20 can be used on any animal with a fur or hair coat, such as rabbits or ferrets.

The pet engageable portion 22 has at least a first brush section 30 of a first brush characteristic and a second brush section 32 of a second brush characteristic different from the first brush characteristic. By "brush characteristic", it is meant a grooming function and/or a size. That is, there are various types of grooming functions, depending on what is desired to be accomplished by the grooming. Types of brush characteristics, i.e. grooming functions including: deshedding (removing loose, dead undercoat); dematting to remove mats; pin brushes to fluff detangled or wiry coats; bristle brushes as finishing tools to distribute natural oils and add shine; slicker brushes to detangle and remove lighter mats; rubber curry combs for massaging skin; and various types of combs for detangling, dematting, or fluffing. Size differences can include density (such as bristle or tooth density) and/or length of bristles/teeth.

In some examples, the first brush section 30 and second brush section 32 can be separated by intervening parts or a sizable gap (i.e., greater than 1 inch). In the example shown, the first brush section 30 and the second brush section 32 are adjacent to each other, i.e. not separated by intervening parts, and within 1 inch, typically within 0.5 inch of each other.

In the example embodiment shown, the first brush characteristic of the first brush section 30 is a deshedder blade section 31, constructed and arranged to remove loose, dead undercoat without cutting or damaging a topcoat or cutting skin. The deshedder blade section 31 can be constructed according to U.S. Pat. No. 7,650,857, or U.S. Pat. No. 8,960,129, each incorporated herein by reference. The deshedder blade section 31 may comprises a plurality of teeth 35, preferably formed of metal, and preferably formed in a straight row.

Figure 13:
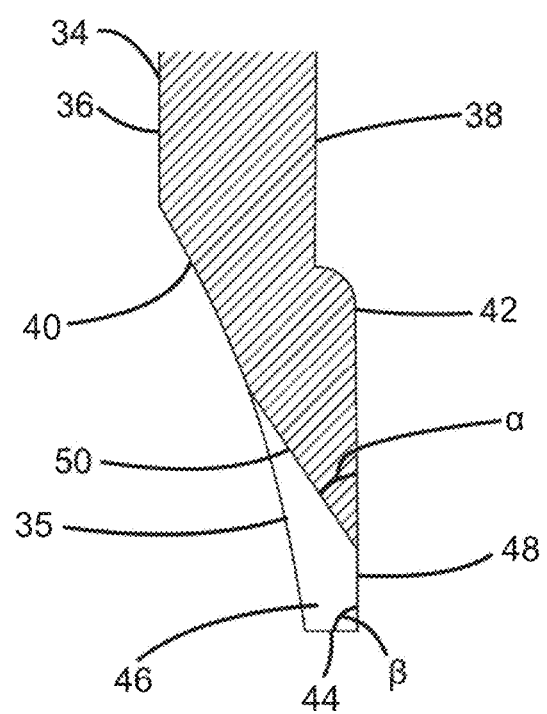
FIG. 13 is a cross-sectional view of one of the toothed portion of a deshedder blade section used in the grooming tool of FIG. 1.
Figure 14:
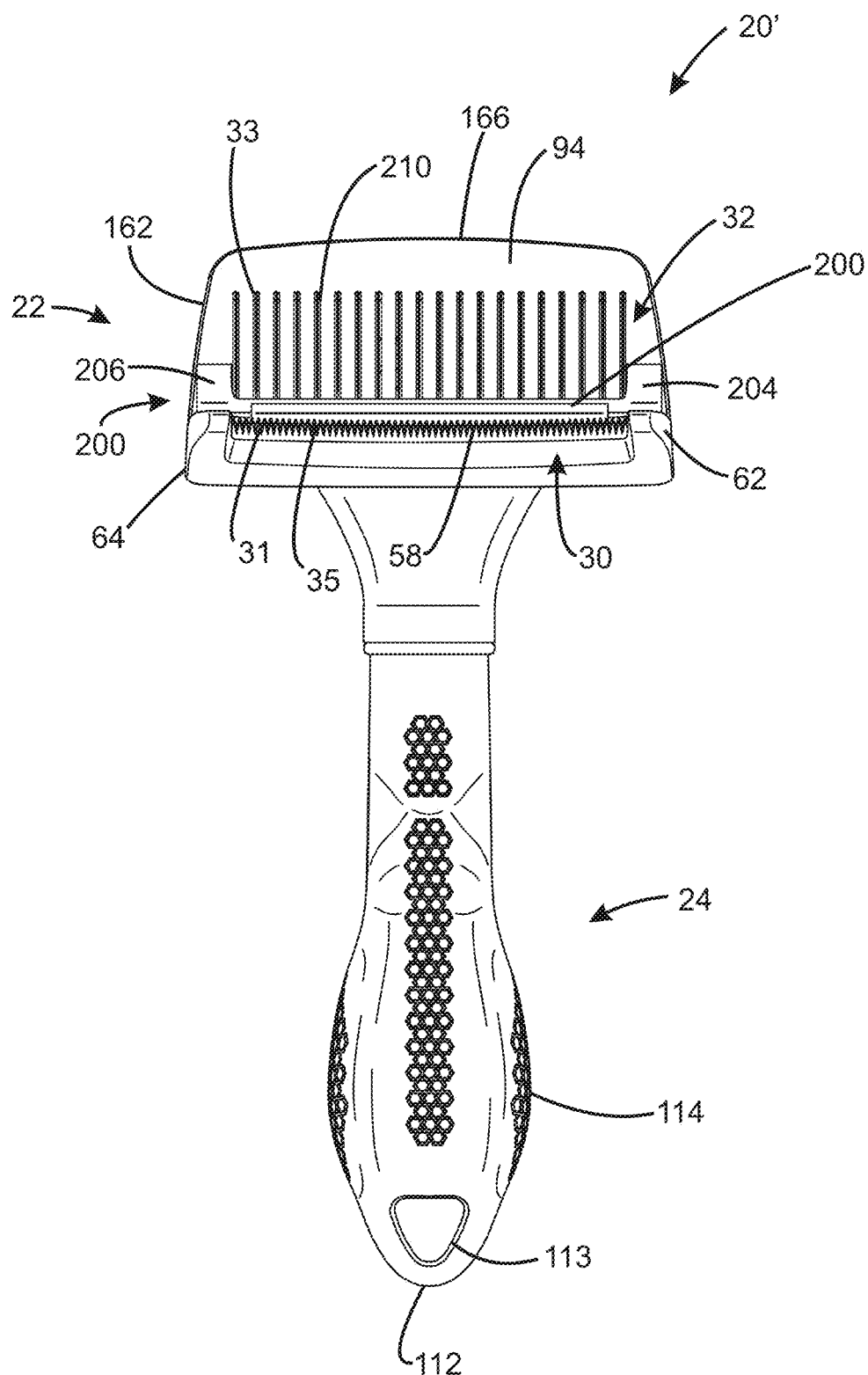
FIG. 14 is a top plan view of a second embodiment of a grooming tool, constructed in accordance with principles of this disclosure.
Figure 15:
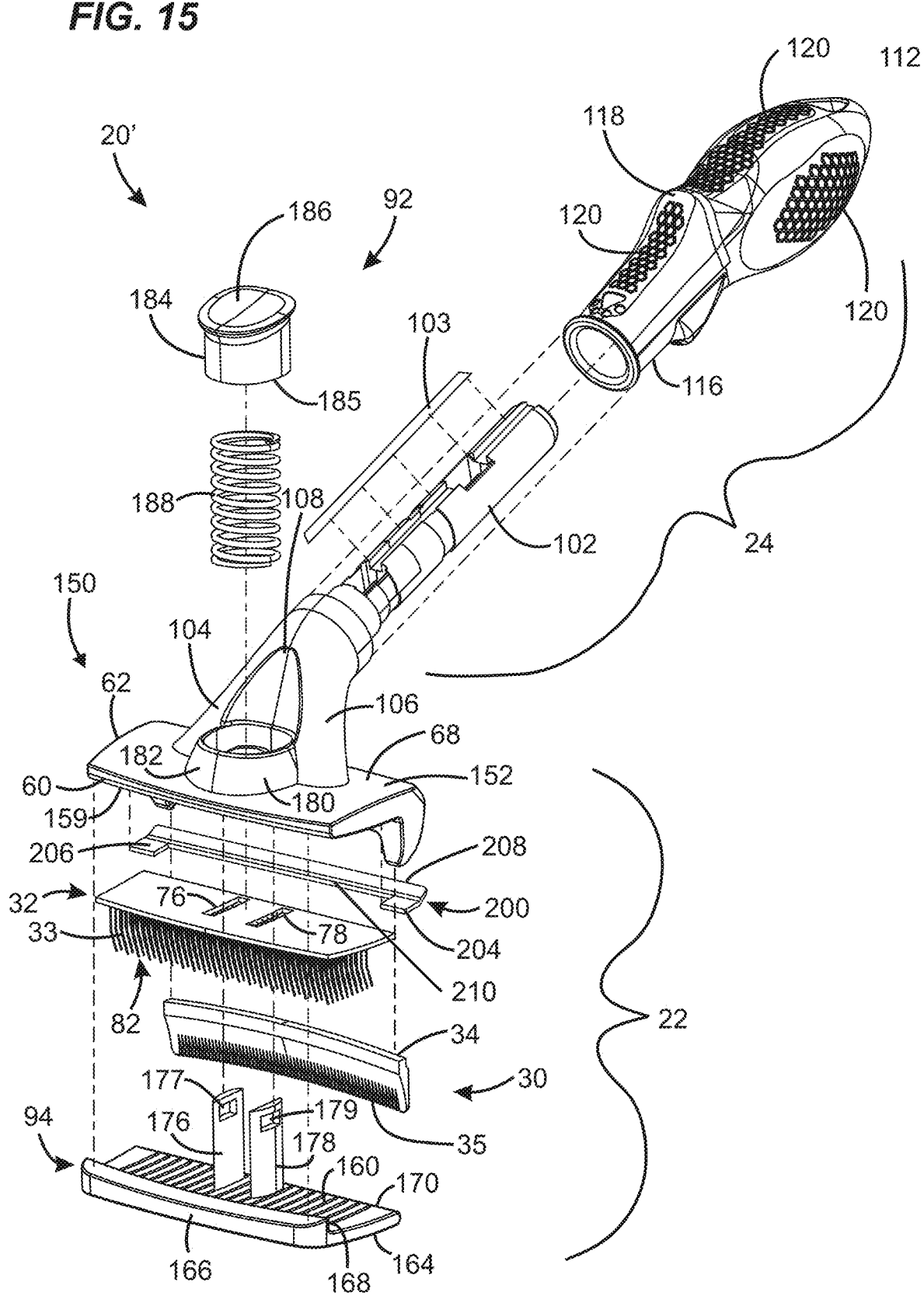
FIG. 15 is an exploded perspective view of the grooming tool of FIG. 14.
Figure 16:
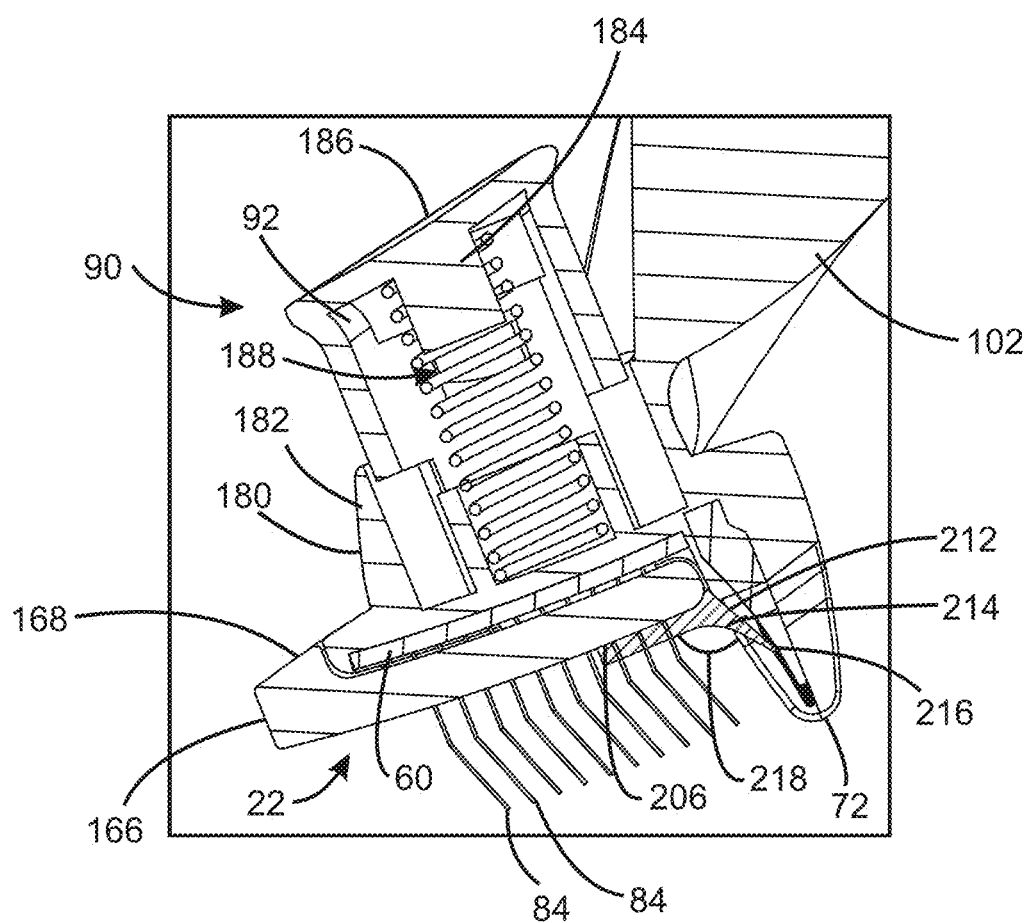
FIG. 16 is a cross-sectional view of a portion of the grooming tool of FIG. 14.

In reference now to FIG. 13, preferably, the deshedder blade section 31 comprises a main body 34 having opposite forward facing 36 a rearward facing 38 surfaces. The forward facing 36 and rearward facing 38 surfaces are preferably parallel planar surfaces. The teeth 35 preferably extend from a front surface 40 to a back surface 42. The front surface 40 preferably tapers toward the back surface 42 as the surfaces extend toward the tips 44 of the teeth 35. Preferably the sides 46 of the teeth 35 intersect the back surface 42 in a manner forming a plurality of edge segments 48. The edge segments 48 formed by the sides 46 of the teeth 35 have an angle β of approximately ninety degrees. Forward facing surface segments 50 extend between the teeth 35 and intersect the back surface 42 in manner forming additional edge segments 48. The edge segments 48 formed by the forward facing surface segments 50 are preferably acutely angled at angle α (i.e., less than 60 degrees, such as no greater than 50 degrees, typically less than 45 degrees, and often about 40 degrees or less).

The first brush section 30 is located on the pet engageable portion 22 preferably so that it is the leading part of the pet engageable portion 22 to move through the pet's fur or hair, during use. The teeth 35 of the first brush section 30 extend between opposite lateral edges 62, 64 of the pet engageable portion 22, generally along a straight line between the edges 62, 64.

Figure 4:
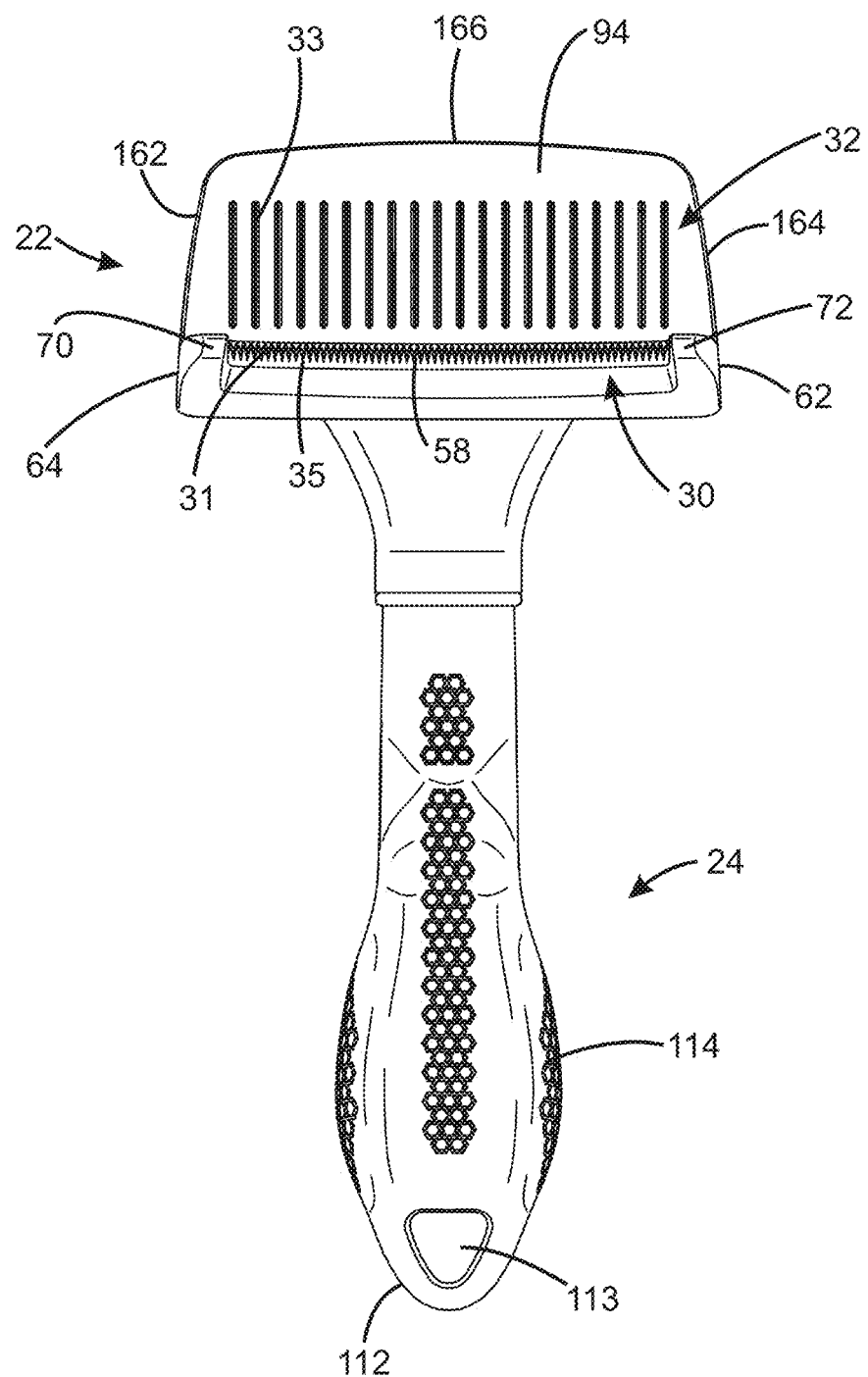
FIG. 4 is a bottom plan view of the grooming tool of FIG. 1.
Figure 5:
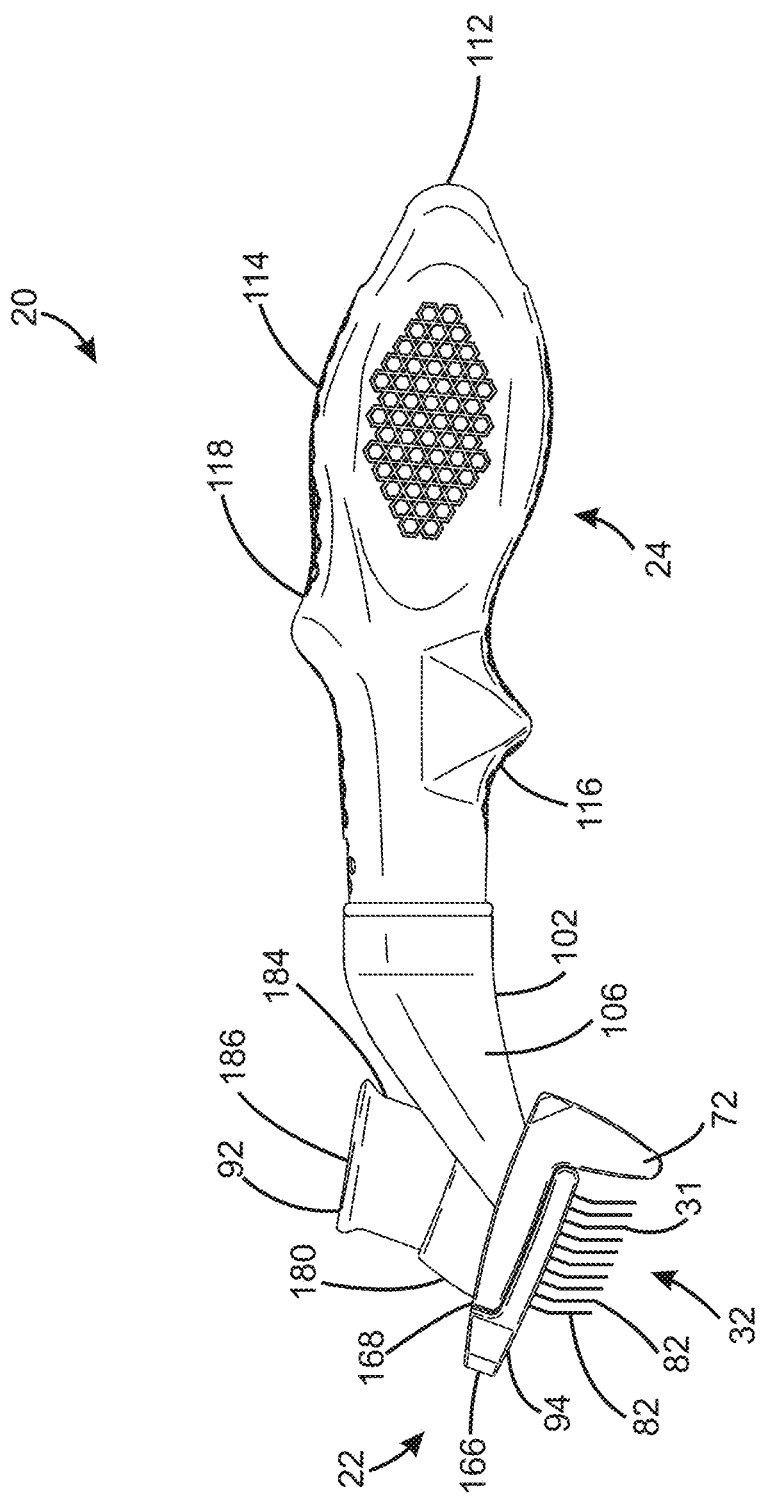
FIG. 5 is a right side view of the grooming tool of FIG. 1.
Figure 6:
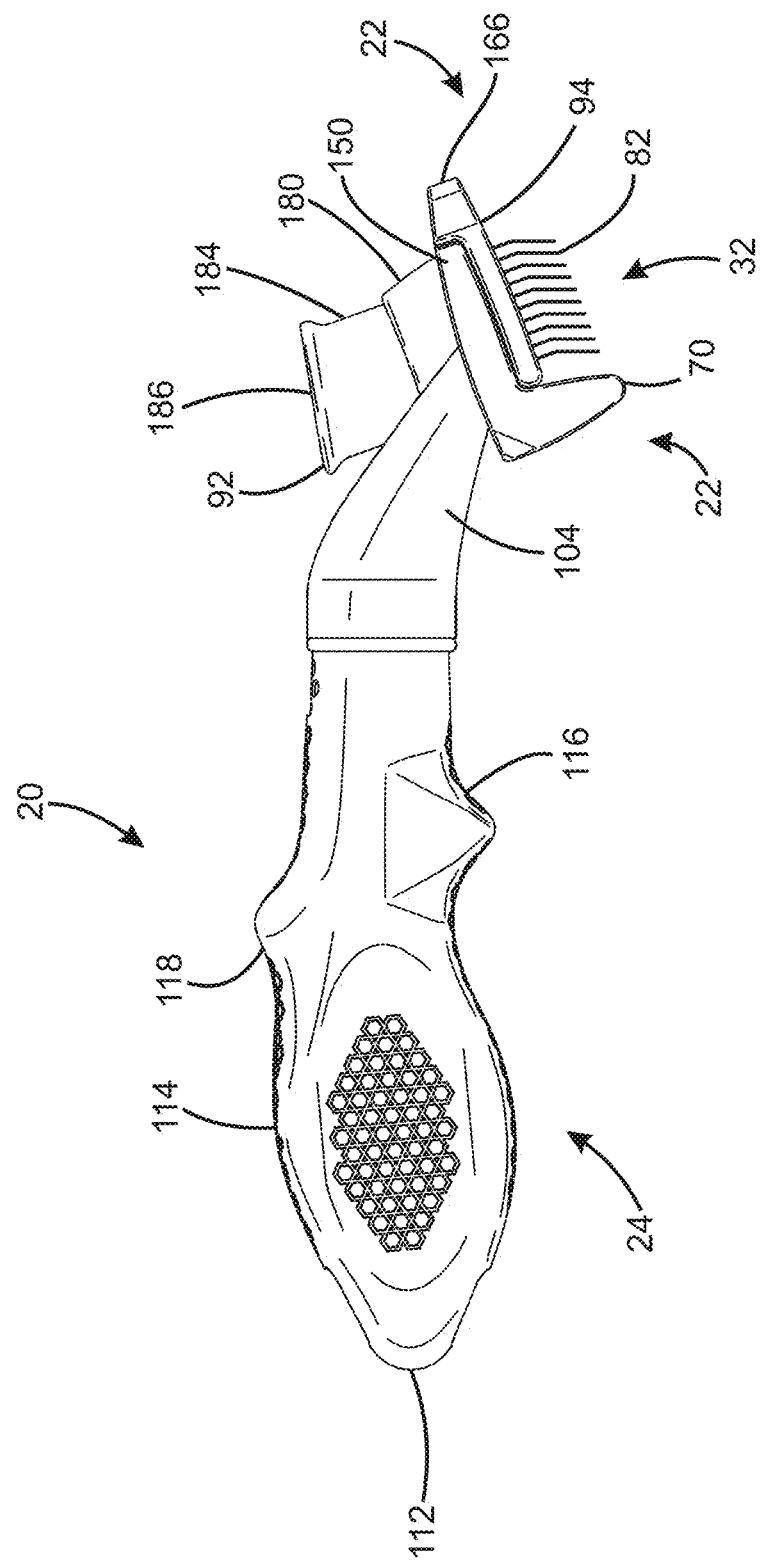
FIG. 6 is a left side view of the grooming tool of FIG. 1.
Figure 7:
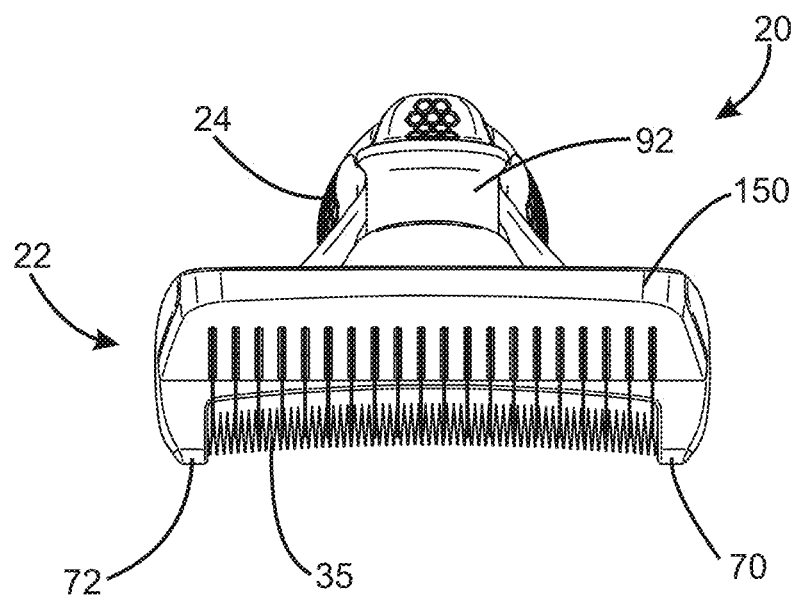
FIG. 7 is a front view of the grooming tool of FIG. 1.

In preferred embodiments, the plurality of teeth 35 in the first brush section 30 are arranged along a curved arch to be concave as they extend or project from the pet engageable portion 22 and between the lateral edges 62, 64. That is, when viewing in plan view (FIG. 4), the tips 44 of the teeth 35 at the lateral edges 62, 64 are closer to the viewer than the centerpoint 58 of the first brush section 30. The curved arch can be observed in FIG. 8, as well.

In the example embodiment illustrated, the second brush section 32 is a slicker tines section 33 constructed and arranged to remove debris, tangles, and mat from fur. The slicker tines section 33 can separate and detangle fur, without scratching skin. In this example, the slicker tines section 33 comprises a plurality of flexible fine wire bristles 82 each having a longitudinal axis generally angled non-orthogonal to the face 60, although in some embodiments, the bristles 82 can be orthogonal to the face 60 of the pet engageable portion 22. The angle 84 (FIG. 12) is shown to be in a direction toward the first brush section 30, as the bristles 82 extend from the pet engageable portion 22 and out to the terminal ends of the bristles 82. The angle is generally less than 20 degrees from a vertical line extending perpendicular to the pet engageable portion 22.

The bristles 82 are preferably arranged in a plurality of columns and rows. While a variety of numbers of bristles can be used, typically there will be at least 5 rows and 10 columns; often at least 7 rows and 15 columns; and often 9-12 rows and 18-22 columns.

Preferably, in use, the slicker tines section 33 collects hair/fur to create a "patty" or clump of fur, which also can include fur from the first brush section 30. The patty or clump of fur can then easily be removes by a fur removal mechanism 90, discussed below.

Figure 9:
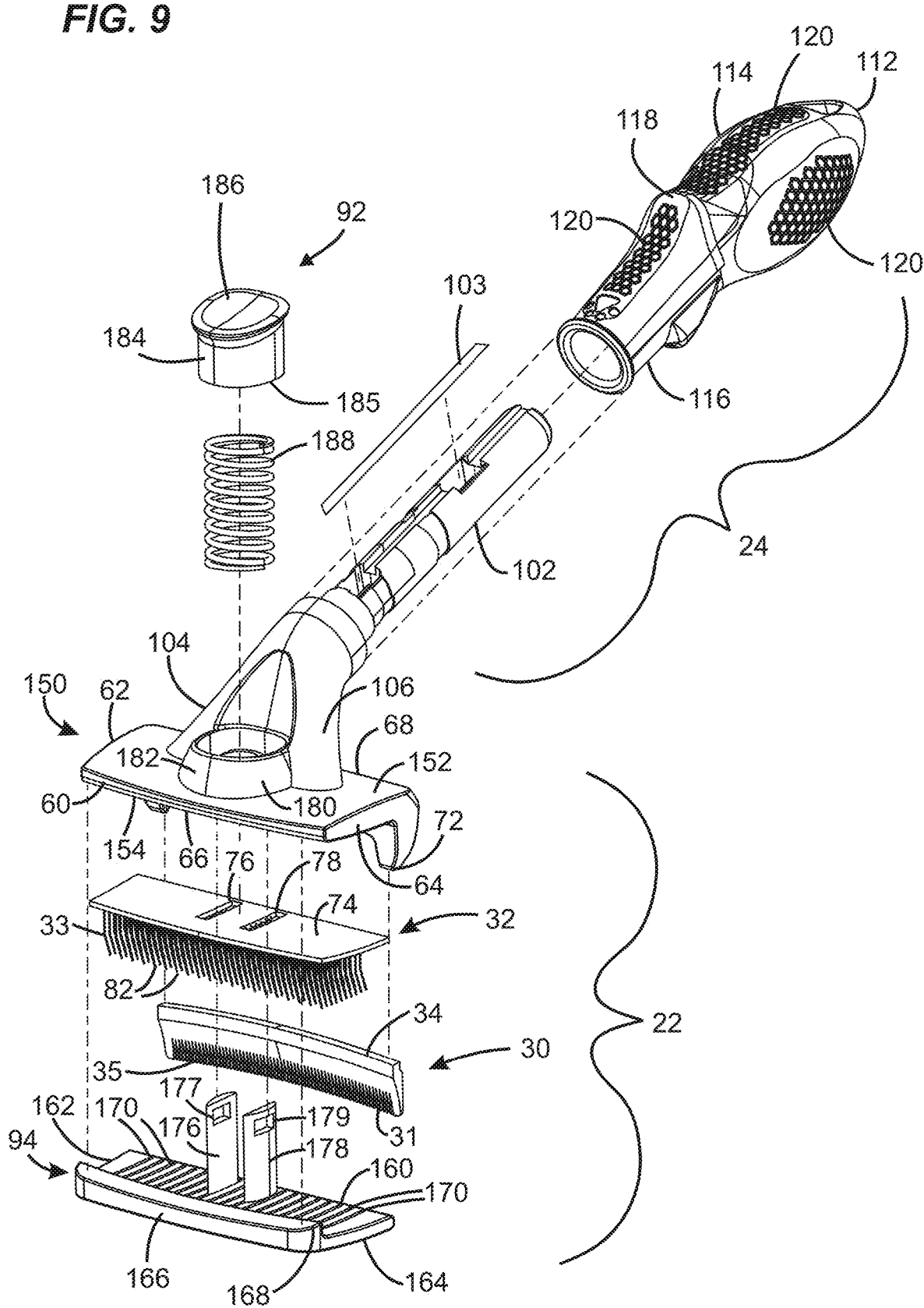
FIG. 9 is an exploded perspective view of the grooming tool of FIG. 1

In reference now to FIG. 9, the pet engageable portion 22 has a base 150. The base 150 has a handle-engageable surface 152 connected to the handle portion 24, and an opposite surface comprising the face 60. The face 60 generally is a brush surface 154 including at least the second brush section 34. In many typical arrangements, the base 150 is made from a molded plastic.

Figure 2:
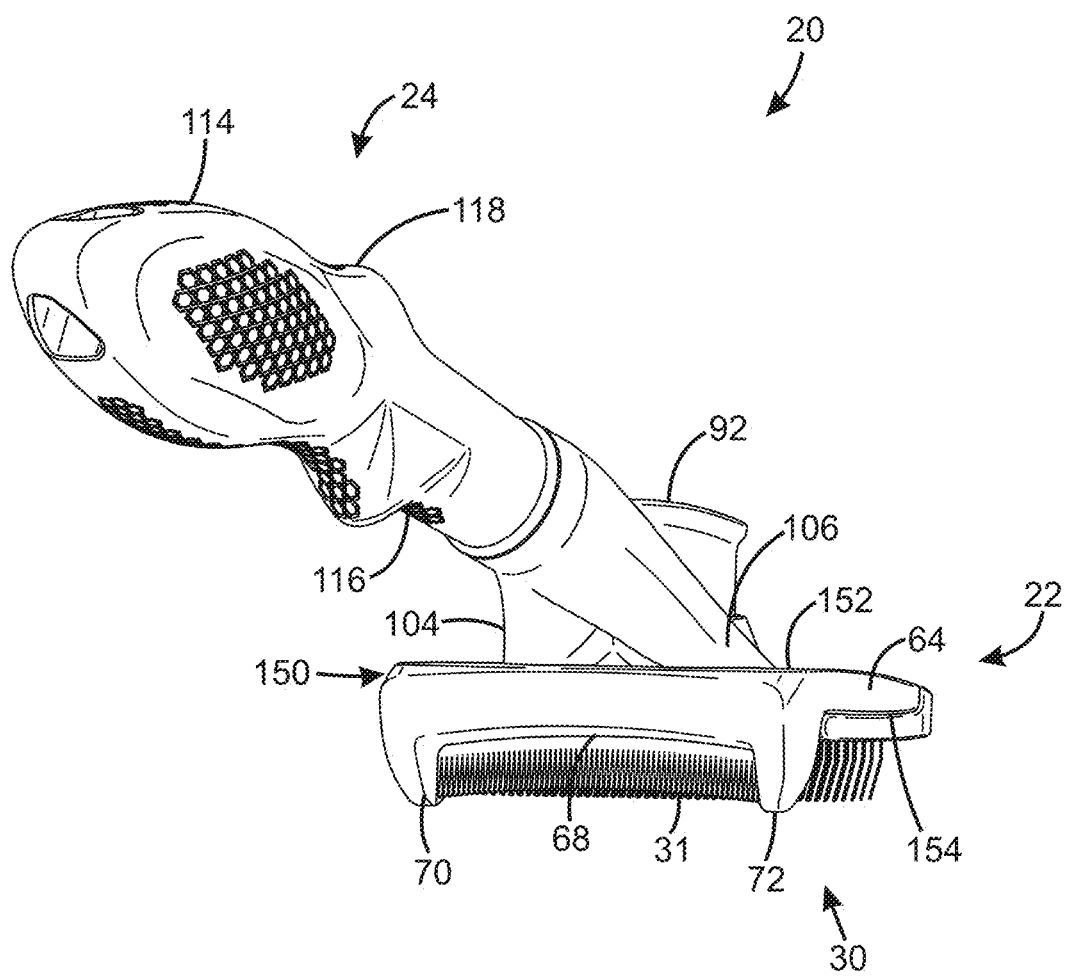
FIG. 2 is a rear perspective view of the grooming tool of FIG. 1.
Figure 3:
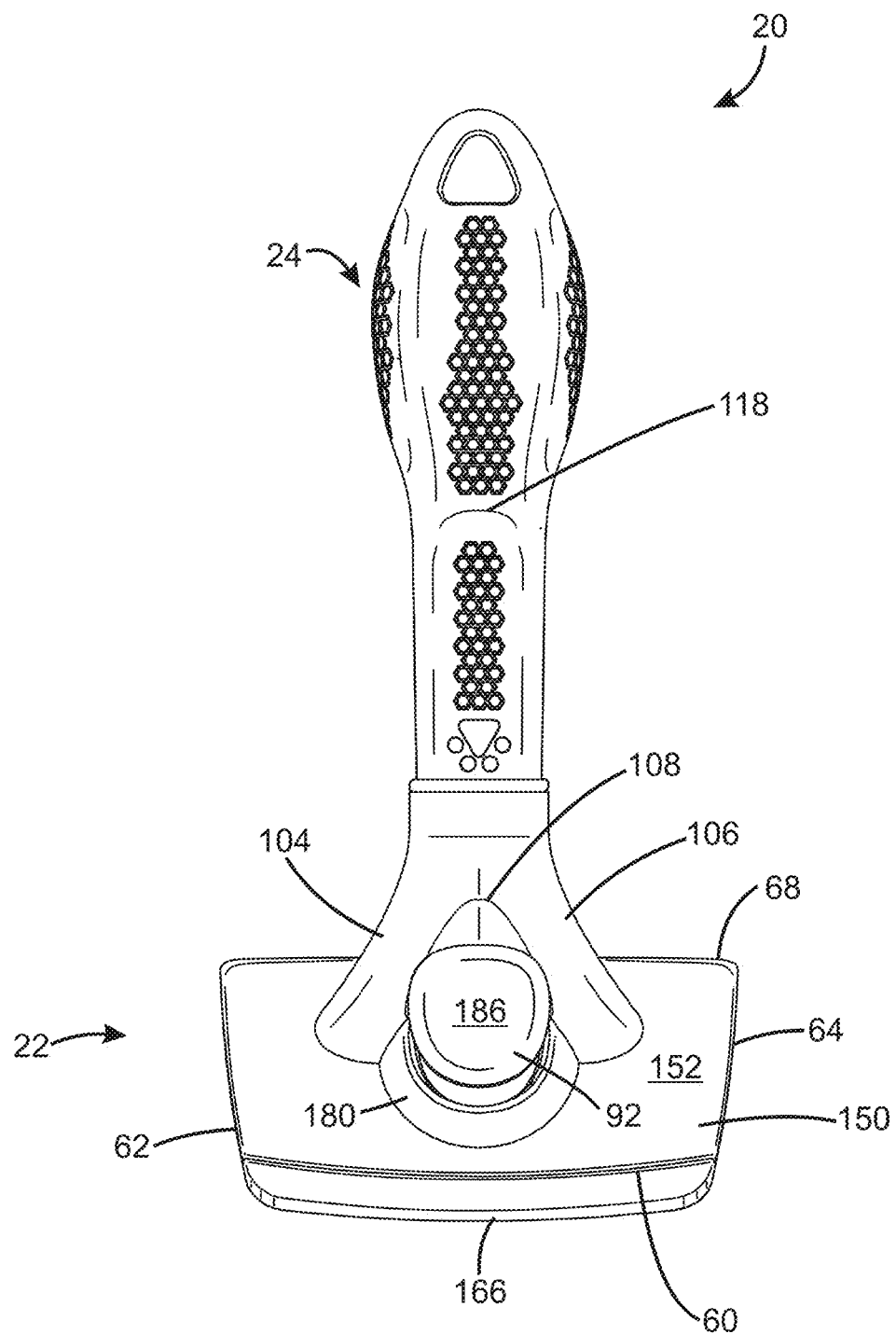
FIG. 3 is top plan view of the grooming tool of FIG. 1.
Figure 8:
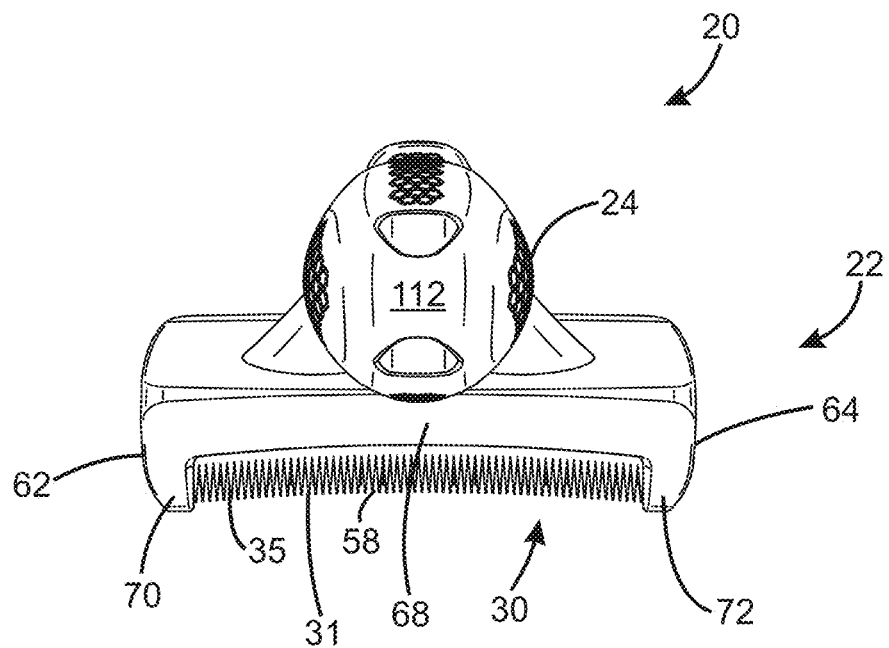
FIG. 8 is a rear view of the grooming tool of FIG. 1.

The base 150 is generally rectangular in shape having lateral sides/edges 62, 64; a front side 66 extending between the lateral sides 62, 64; and rear side 68 opposite of the front side 66 also extending between the lateral sides 62. 64. The base 150, in the embodiment shown, further includes corner projections 70, 72 (FIGS. 2 and 8) at the intersection of the lateral sides 62, 64. The corner projections 70, 72 extend in a direction to project away from the handle-engageable surface 152 and extend beyond the brush surface 154. In use, the deshedder blade section 31 extends between the corner projections 70, 72. As can be seen in FIG. 8, the deshedder blade section 31 is exposed for use under the rear side 68 and between the corner projections 70, 72.

Figure 10:
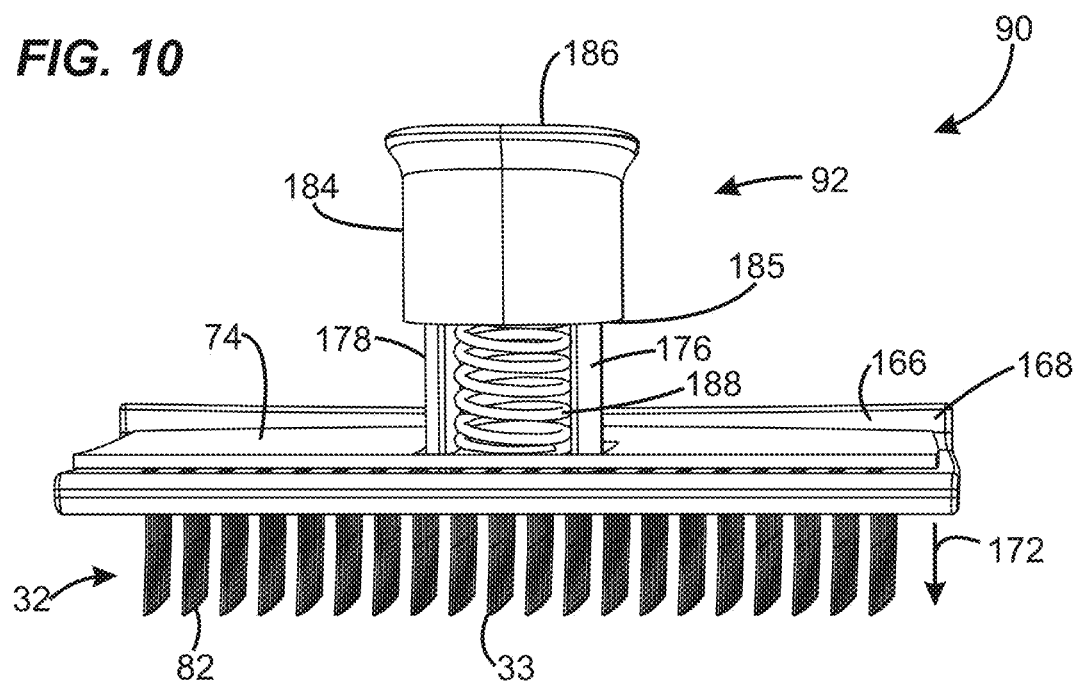
FIG. 10 is an enlarged perspective view of components of a fur removal mechanism, used in the grooming tool of FIG. 1; the fur removal mechanism being shown at rest, under no force.
Figure 11:
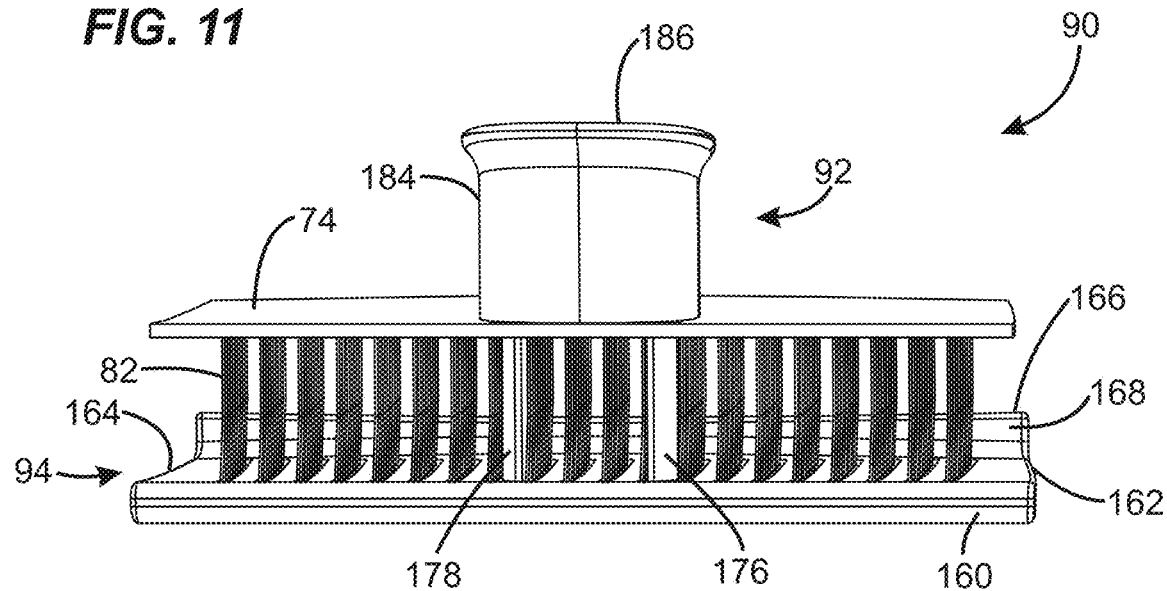
FIG. 11 is the fur removal mechanism of FIG. 10, but shown during fur ejection.

In FIGS. 9-11, it can be seen how the slicker tines section 33 includes a support 74 holding or to which the bristles 82 are affixed. The support 74 is non-removably secured to the brush surface 154 of the base 150. The security can be with adhesive or other ways.

The support 74 includes a pair of slots 76, 78 (FIG. 9). The slots 76, 78 are sized to receive parts of the fur removal mechanism 90, described below.

In accordance with principles of this disclosure, the handle portion 24 includes a fixed piece 102 secured to, and projecting away from, the pet engageable portion 22. The fixed piece 102 projects axially away from the pet engageable portion 22 adjacent to the rear side 68 of the base 150. In this example embodiment, the fixed piece 102 is V-shaped, with the ends of the legs 104, 106 of the V-shape being secured to the handle-engageable surface 152 of the base 150 of the pet engageable portion 22, while the apex 108 of the V-shape is axially and radially spaced from and over the pet engageable portion 22. Inside of the fixed piece 102, there can also be a steel pin or rod 103, shown in FIG. 9 and in hidden lines in FIG. 12. The steel pin 103 can be helpful for automation during assembly, and for maintaining structure of the overall handle portion 24.

The handle portion 24 includes a free distal end 112. The distal end 112 is both radially spaced and axially spaced from the pet engageable portion 22. An optional aperture 113 extends through the handle portion 24, adjacent the distal end 112. The aperture 113 can be used to hang the tool 20 on a hook or other projection, during storage.

The handle portion 24 includes an elongated grip 114 extending between the fixed piece 102 and defining the distal end 112. The grip 114 is both axially and radially spaced from the pet engageable portion 22. In this embodiment, the grip 114 includes an optional index finger recess 116 and thumb rest 118. The grip 114 can also have an optional texturized area 120 for enhanced gripping.

Preferably, the grip 114 is made from a molded plastic material. As shown in the example embodiment depicted, the first brush section 30 is nearer the handle portion 24 than the second brush section 32.

Figure 12:
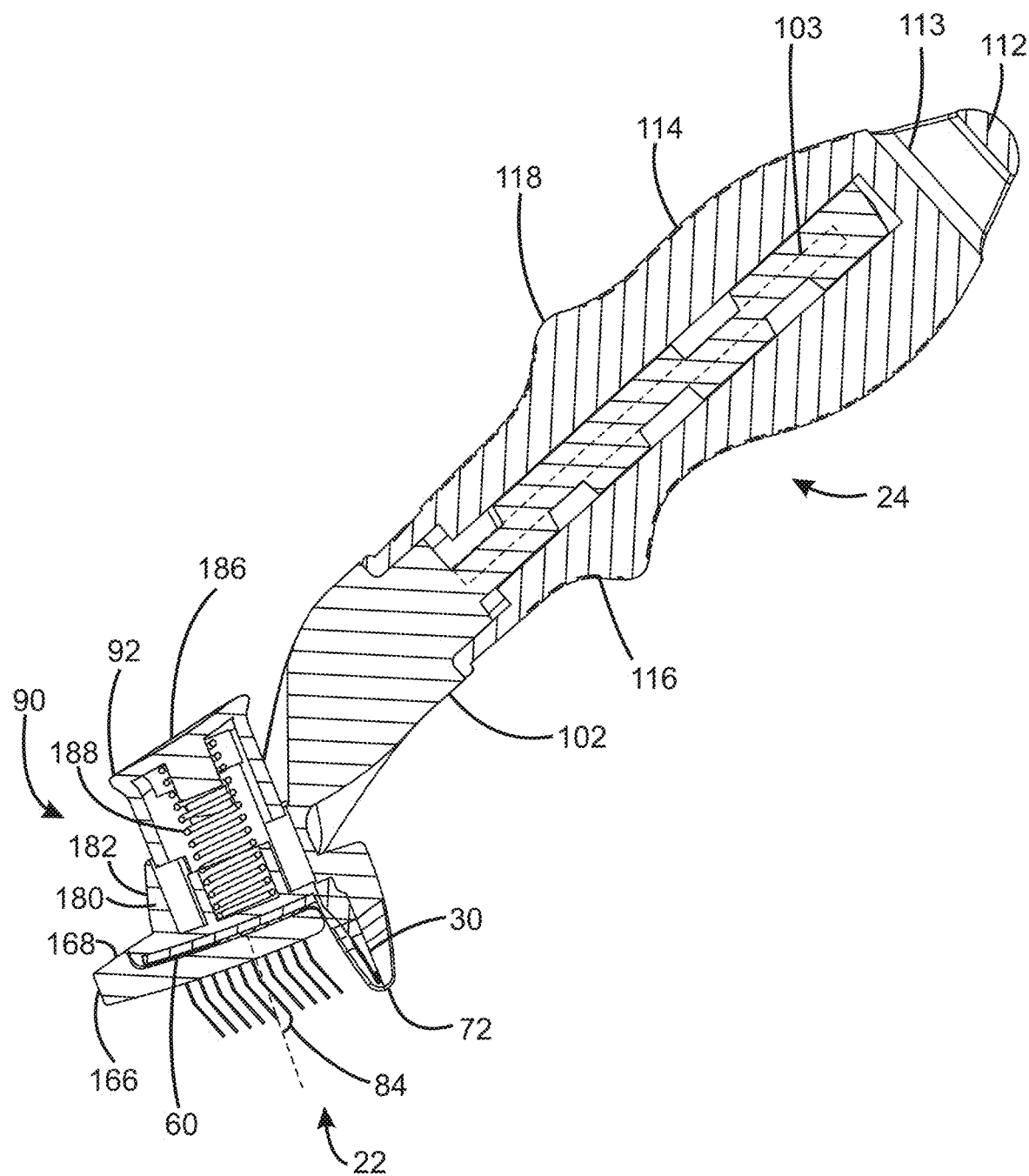
FIG. 12 is a longitudinal cross-sectional view of the grooming tool of FIG. 1.

In accordance with principles of this disclosure, the tool 20 includes a fur removal mechanism 90 (FIGS. 10-12). The fur removal mechanism 90 selectively removes fur from the pet engageable portion 22.

In one example embodiment, the fur removal mechanism 90 comprises a push button 92 to eject fur from the first brush section 30 and second brush section 32. While there can be many variations, in the example shown in FIG. 4, the push button 92 is spring-biased and moves a moveable ejector plate 94 axially away from the brush surface 154 of the base 150. Specifically, as shown in FIG. 11, the ejector plate 94 moves axially away from the support 74 of the second brush section 32.

As shown in FIGS. 9-11, the ejector plate 94 includes a back edge 160, which is shown as generally straight; a pair of opposite side edges 162, 164 extending from the back edge 160; and a front edge 166 also extending between the side edges 162, 164 and opposite of the back edge 160. A projecting lip 168 projects from the front edge 166 in a direction toward the brush surface 154 to overlap or engage against the front side 66 of the base 150.

Still in reference to FIG. 9, the ejector plate 94 includes a plurality of open slots 170. The slots 170 are elongated and extend from adjacent the back edge 160 to adjacent the front edge 166. The slots 170 are sized and positioned to contain and slide over the bristles 82 of the second brush section 32. Preferably, there will be at least the same number of slots 170 as columns of bristles 82, such each column of bristles 82 is contained within one of the slots 170.

At rest (FIG. 10), the ejector plate 94 is positioned against the support 74. When the button 92 is pushed, the ejector plate 94 is moved away from the support 74 in the direction of arrow 172 in FIG. 10 to the position spaced from the support 74 as shown in FIG. 11. As it moves away, the plate 94 pushes fur and hair out from the bristles 82.

The ejector plate 94 further includes a pair of engagement flanges 176, 178 extending from and perpendicular to the main face 174 of the plate 94. The flanges 176, 178 pass through the slots 76, 78 of the support 74 of the second brush section 32 and into a button housing 180. Each of the flanges 176, 178 has a receiving hole 177, 179 adjacent to the end of the flanges 176, 178 remote from the main face 174 of the plate 94. The receiving holes 177, 179 engage with internal catches along an interior portion of the button 92.

The button housing 180 is located on the handle engageable surface 152 of the base 150. As shown in FIGS. 9 and 12, the button housing 152 includes an upright surrounding wall 182 projecting from the handle engageable surface 152 and located between the legs 104, 106, just forward of the apex 108 of the V-shaped fixed piece 102.

The upright surrounding wall 182 circumscribes and slidably holds the button 92. The button 92 has a tubular wall 184 with an open end 185 and closed top 186. The closed top 186 is sized and positioned for engagement with a human thumb, during use. The closed top 186 projects above a free end of the wall 182 of the button housing 152, and the button 92 can slidably move vertically (up and down) within the wall 182 of the button housing 152. The engagement flanges 176, 178 connect the button 92 to the plate 94 via the receiving holes 177, 179 on the flanges 176, 178 engaging with internal catches along an interior portion of the button 92.

A biasing mechanism, such as spring 188, is positioned in the interior of the button 92 between and against the handle engageable surface 152 and an interior side of the closed top 186. The spring 188 biases the button 92 outwardly, i.e., away from the handle engageable surface 152 of the base 150 in its resting position.

When the button 92 is pressed against the spring 188 toward the base 150, movement of the button 92 moves the flanges 176, 178, which moves the ejector plate 94 away from the support 74. The slots 170 in the plate 94 slide over the bristles 82 of the second brush section 32, and any fur or hair within the bristles 82 are pushed out from the bristles 82 along the main face 174 of the plate 94 to an area beyond the bristles 82, where the collected fur or hair falls by gravity or can be easily collected by hand. When force on the button 92 is released, the spring 188 pushes the button 92 back to its resting position, which moves the plate 94 to its resting position against the support 74.

In this example embodiment, when the button 92 is pressed to move the ejector plate 94, the back edge 160 of the ejector plate 94 is positioned to slidably engage against the first brush section 30, such as against the teeth 35. For example, the back edge 160 can either slide against or very near the forward face 36 of the main body 34 of the deshedder blade section 31. This motion of the back edge 160 of the ejector plate 94 against or next to the first brush section 30 will remove fur or hair in the teeth 35 of the deshedder blade section 31.

In the example embodiments shown, the push button 92 is positioned to project from the handle-engageable surface 152 of the pet engageable portion 22 and adjacent to the fixed piece 102 of the handle portion 24. In many example embodiments, the push button 92 is located between the legs 104, 106, just forward of the apex 108 of the fixed piece 102. Many alternatives are possible.

The above can be used in a method of grooming a pet. The method includes grasping a handle of a grooming tool. For example, this can include grasping the handle portion 24 of grooming tool 20. The handle portion 24 is secured to a pet engageable portion, such as pet engageable portion 22.

The method includes a step of moving the pet engageable portion 22 against fur (or hair) of a pet. The pet engageable portion 22 will having a first brush section of a first brush characteristic adjacent to a second brush section having a second brush characteristic different from the first brush characteristic. For example, the first section can be as described above for first section 30 and second section as described above as second section 32. This can include the first section 30 being a deshedder blade section 31; and the second section 32 being a slicker tines section 33.

The method can further comprise a step of ejecting fur from the first brush section 30 and second brush section 32. The step of ejecting fur can include pushing a button, such as button 92. This can include moving ejector plate 94 along bristles 82 of the second brush section 32, and moving edge 160 of ejector plate 94 along the front surface 40 of the first brush section 30.

In one example, the step of grasping a handle includes grasping a grip 114 extending from the pet engageable portion 22.

In an alternative embodiment, the fur removal mechanism 90 can include, instead of the ejector plate 94 moving down over the brush sections to remove the hair/fur, the second brush section 32 could retract into the pet engagement portion 22, which would move against other surfaces on the pet engagement portion 22 and remove the hair/fur. Other alternatives are possible.

FIGS. 14-19

In reference now to FIGS. 14-19, a second embodiment of the tool is shown at 20'. The common parts from FIGS. 1-13 use the same reference numbers, and their descriptions are not again repeated here, but incorporated by reference here.

The tool 20' includes a scraper 200. The scraper 200 is mounted to slidably engage near or against the first brush section 30. By "near or against", it is meant that the scraper 200 is close enough to the first brush section 30 to engage fur in the first brush section 30, and in some cases, the scraper 200 can be in actual touching/sliding engagement with the teeth 35 of the first brush section.

Figure 17:
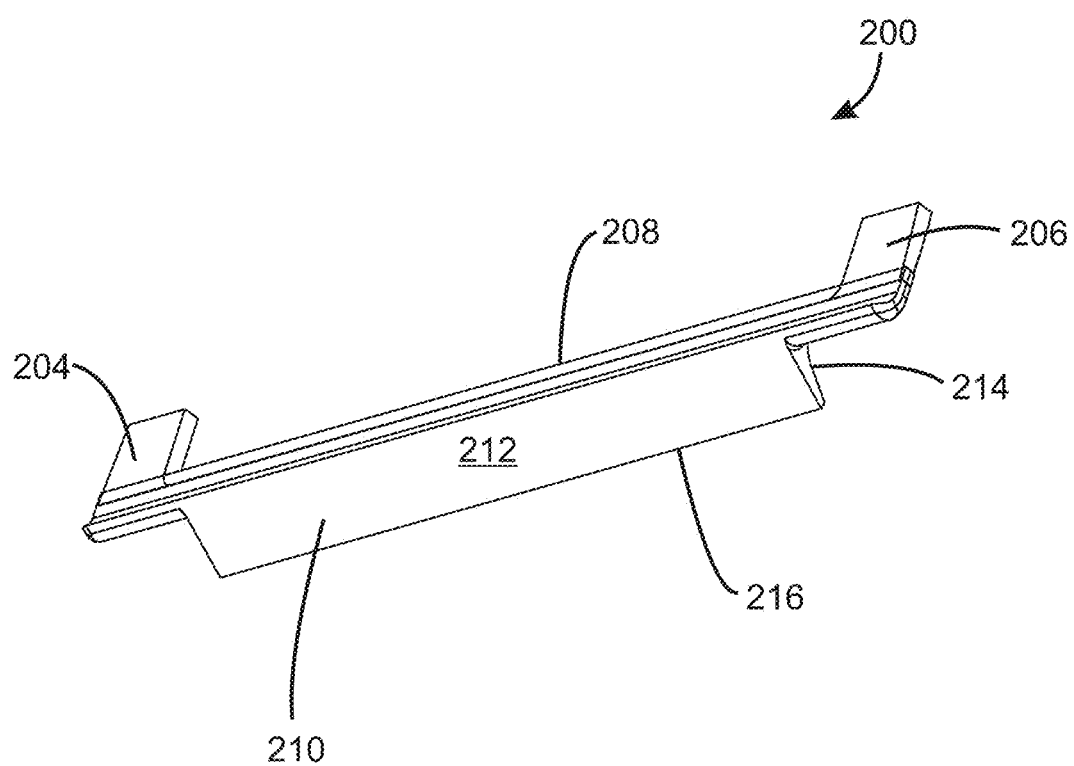
FIG. 17 is a perspective view of a scraper in the grooming tool of FIG. 14.
Figure 18:
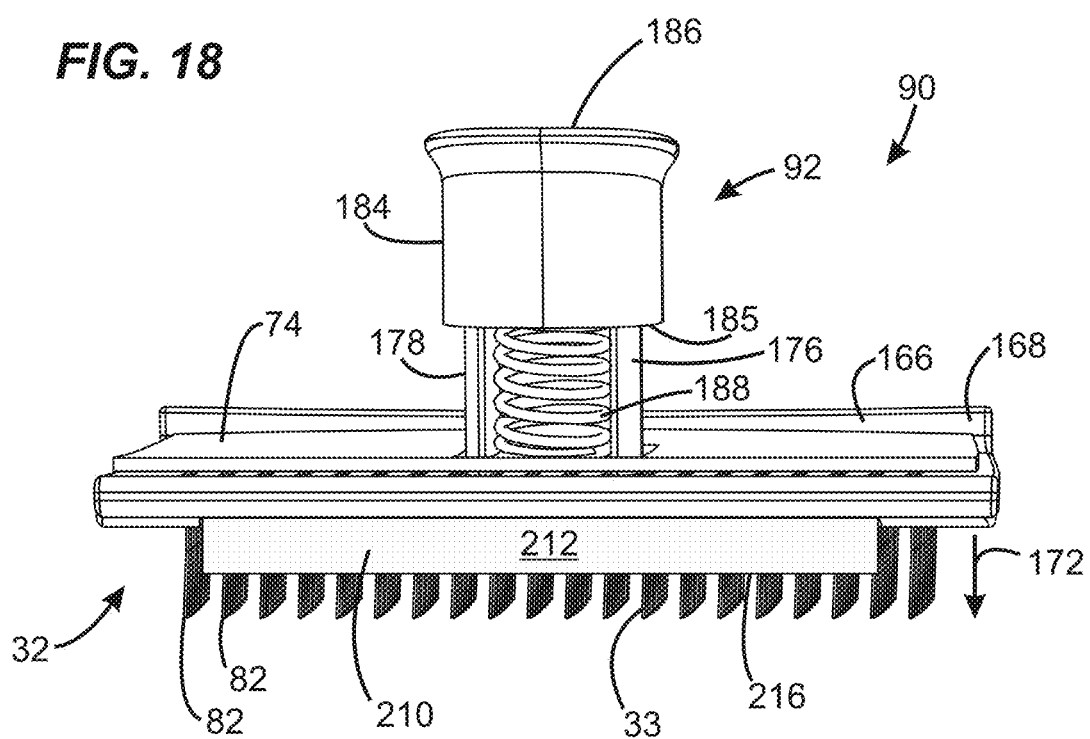
FIG. 18 is an enlarged perspective view of components of a fur removal mechanism, used in the grooming tool of FIG. 14; the fur removal mechanism being shown at rest, under no force.
Figure 19:
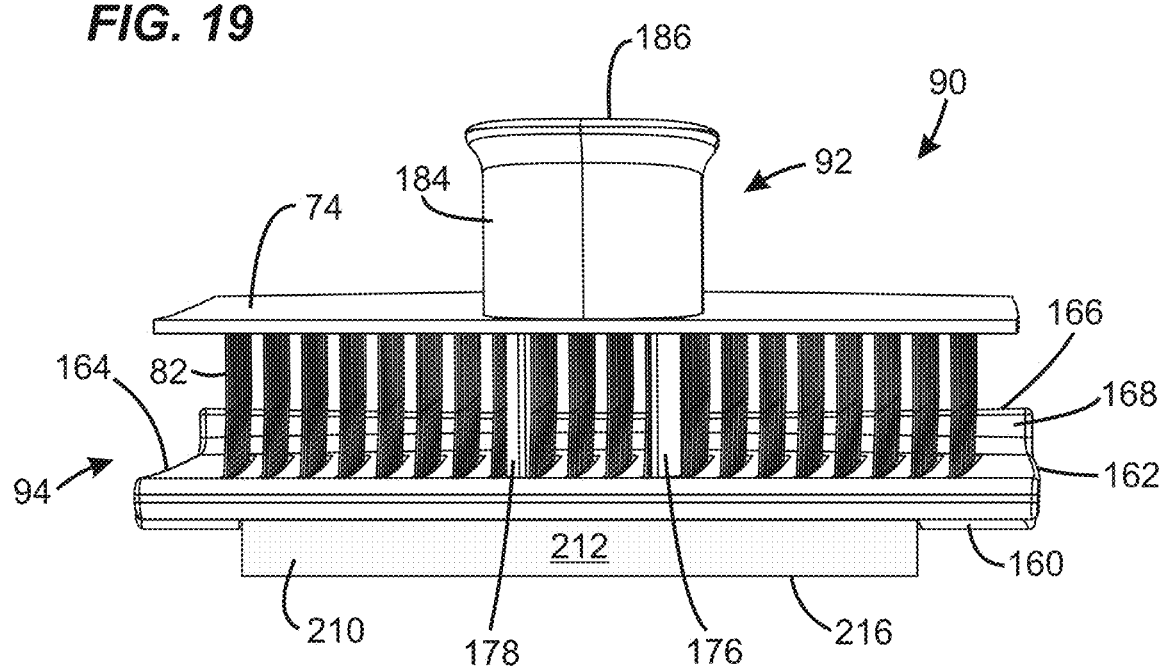
FIG. 19 is the fur removal mechanism of FIG. 18, but shown during fur ejection.

In reference now to FIG. 17, the scraper 200 includes an attachment member 202. The attachment member 202 has a pair of arms 204, 206 at opposite ends of the scraper 200 with a bar 208 extending therebetween. In general, the arms 204, 206 and the bar 208 are co-planar with each other. A variety of ways can be used to secure the scraper to the ejector plate 94. In one example, the scraper 200 is integrally molded with the ejector plate 94. Other methods can included the arms 204, 206 and bar 208 securing the scraper 200 to the ejector plate 94 via heat staking or other methods.

The scraper 200 includes a blade 210 projecting from the attachment member 202. The blade 210 has opposite first and second surfaces 212, 214 and a free, terminal end 216. In the example shown, the blade 210 projects at an angle from the bar 208. In particular, the blade 210 is angled from the attachment member 202 (e.g., the bar 208) at a non-zero and non-perpendicular angle 218 (FIG. 16) in a direction toward the first brush section 30, such that the terminal end 216 is near or touching the teeth 35. In general, in some examples, the angle 218 of the blade 210 is such that the terminal end 216 remains in contact with the first brush section 30 as the ejector plate 94 is pressed down, following the path of the first brush section 30; but, the angle 218 is not so much that there is extensive contact between the blade 210 and the first brush section 30 to avoid large amounts of friction between the two. In examples, the angle 218, as measured from the plane containing the arms 204, 206, to the second surface 214 can be at least 95°, not greater than 170°, typically 110-140°, e.g. about 122-128°, e.g. 125°.

The method of using the tool 20' can comprise a step of ejecting fur from the first brush section 30 and second brush section 32. The step of ejecting fur can include pushing a button, such as button 92. This can include moving ejector plate 94 along bristles 82 of the second brush section 32. The step of using the moveable ejector plate 94 can include moving the scraper 200 to slidably engage near or against the first brush section 30.

The step of moving the scraper 200 can include moving the blade 210 angled toward the first brush section 30.

The above describes example principles. Many embodiments can be made using these principles.

What is claimed is:

1. A pet grooming tool comprising:
   (a) a pet engageable portion having a first brush section of a first brush characteristic and a second brush section of a second brush characteristic different from the first brush characteristic;
      (i) the pet engageable portion comprising a base having lateral sides;
      (ii) the base including corner projections at intersections of the lateral sides, the corner projections extending beyond a brush surface of the base;
   (b) a handle portion secured to the pet engageable portion sized for grasping by a human hand; and
   (c) a fur removal mechanism to remove fur from by engaging both the first brush section and second brush section in the pet engageable portion; the fur removal mechanism including a moveable ejector plate and a push button connected to the ejector plate, wherein:
      (i) the push button is positioned on the handle-engageable surface of the base;
      (ii) the ejector plate is moveably mounted to slide over the second brush section; and
      (iii) the ejector plate has an edge mounted to slidably engage the first brush section such that when the push button is pressed toward the base, the ejector plate slides over the second brush section and against the first brush section to move fur from the first brush section and second brush section; and
      (iv) the first brush section extends between the corner projections, and the edge of the ejector plate slidably engages the first brush section between the corner projections.

2. The tool of claim 1 wherein the first brush section and second brush section are adjacent each other.

3. The tool of claim 1 wherein the first brush characteristic is a deshedder constructed and arranged to remove loose, dead undercoat without cutting or damaging a topcoat.

4. The tool of claim 3 wherein the deshedder comprises a plurality of teeth having a plane of symmetry and a tip; the plane of symmetry defining a cross-section of the tip of the tooth; the cross-section of the tip of the tooth having a corner with an interior angle of between fifty and seventy degrees.

5. The tool of claim 1 wherein the brush characteristic of the second brush section is a slicker constructed and arranged to remove debris, tangles, and mat from fur.

6. The tool of claim 5 wherein the slicker comprises a plurality of flexible fine wire bristles.

7. The tool of claim 6 wherein the flexible fine wire bristles are angled in a direction toward the first brush section, as the flexible fine wire bristles extend from the pet engageable portion and out to terminal ends thereof.

8. The tool of claim 1 wherein the push button is positioned in a button housing on the base; the button housing including a spring to bias the push button.

9. The tool of claim 1 wherein:
   (a) the second brush section includes plurality of bristles, arranged in a plurality of columns and rows; and
   (b) the ejector plate includes a plurality of open slots positioned to contain and slide over the bristles.

10. The tool of claim 1 wherein:
    (a) the first brush section includes row of teeth; and
    (b) the ejector plate edge slides against and along the teeth.

11. The tool of claim 10 wherein the first brush characteristic is a deshedder section, and the second brush characteristic is a slicker.

12. The tool of claim 1 wherein the ejector plate includes a projecting lip that engages against an edge of the base.

13. The tool of claim 1 wherein the handle portion includes:
    (a) a fixed piece secured to and projecting away from the pet engageable portion;
    (b) a free distal end; and
    (c) an elongated grip extending between the fixed piece and the distal end; the grip being axially and radially spaced from the pet engageable portion.

14. The tool of claim 1 wherein the handle portion includes:
    (a) a fixed piece secured to and projecting away from the pet engageable portion;
    (b) a free distal end;
    (c) an elongated grip extending from the fixed piece and defining the distal end; the grip being axially and radially spaced from the pet engageable portion; and
    wherein the push button is positioned to project from the pet engageable portion adjacent to the fixed piece.

15. The tool of claim 1 wherein the first brush section is nearer the handle portion than the second brush section.

16. The tool of claim 1 further including a scraper mounted to slidably engage near or against the first brush section.

17. The tool of claim 16 wherein the scraper includes an attachment member secured to the ejector plate and a blade projecting from the attachment member.

18. The tool of claim 17 wherein the blade is angled from the attachment member at a non-zero and non-perpendicular angle in a direction toward the first brush section.

19. The tool of claim 17 wherein the blade is angled from the attachment member at an angle in a direction toward the first brush section of 110-140°.

20. A pet grooming tool comprising:
    (a) a pet engageable portion having a first brush section of a first brush characteristic and a second brush section of a second brush characteristic different from the first brush characteristic;
    (b) a handle portion secured to the pet engageable portion sized for grasping by a human hand;

(c) a fur removal mechanism including a moveable ejector plate and a push button connected to the ejector plate; and
(d) a scraper mounted to slidably engage near or against the first brush section; the scraper including an attachment member secured to the ejector plate and a blade projecting from the attachment member.

21. The tool of claim 20 wherein the blade is angled from the attachment member at a non-zero and non-perpendicular angle in a direction toward the first brush section.

22. The tool of claim 20 wherein the blade is angled from the attachment member at an angle in a direction toward the first brush section of 110-140°.

23. The tool of claim 20 wherein the fur removal mechanism comprises a push button to eject fur from the first brush section and second brush section.

24. The tool of claim 20 wherein the first brush section and second brush section are adjacent each other.

25. The tool of claim 20 wherein the first brush characteristic is a deshedder constructed and arranged to remove loose, dead undercoat without cutting or damaging a topcoat.

26. The tool of claim 25 wherein the deshedder comprises a plurality of teeth having a plane of symmetry and a tip; the plane of symmetry defining a cross-section of the tip of the tooth; the cross-section of the tip of the tooth having a corner with an interior angle of between fifty and seventy degrees.

27. The tool of claim 20 wherein the brush characteristic of the second brush section is a slicker constructed and arranged to remove debris, tangles, and mat from fur.

28. The tool of claim 27 wherein the slicker comprises a plurality of flexible fine wire bristles.

29. The tool of claim 28 wherein the flexible fine wire bristles are angled in a direction toward the first brush section, as the flexible fine wire bristles extend from the pet engageable portion and out to terminal ends thereof.

30. The tool of claim 20 wherein the ejector plate is moveably mounted to slide over the second brush section.

31. The tool of claim 20 wherein the ejector plate has an edge mounted to slidably engage the first brush section.

* * * * *